(12) United States Patent
Kimmich et al.

(10) Patent No.: US 10,773,771 B2
(45) Date of Patent: Sep. 15, 2020

(54) HYBRID DRIVE FOR AN ELECTRIC BICYCLE

(71) Applicant: Robert Bosch GmbH, Stuttgart (DE)

(72) Inventors: Peter Kimmich, Steinenbronn (DE); Mario Kustosch, Vaihingen/Enz (DE); Philipp Kohlrausch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 15/653,862

(22) Filed: Jul. 19, 2017

(65) Prior Publication Data

US 2017/0313384 A1 Nov. 2, 2017

Related U.S. Application Data

(62) Division of application No. 13/139,496, filed as application No. PCT/EP2009/064375 on Oct. 30, 2009, now Pat. No. 9,758,212.

(30) Foreign Application Priority Data

Dec. 11, 2008 (DE) .................. 10 2008 054 505
Oct. 7, 2009 (DE) .................. 10 2009 045 447

(51) Int. Cl.
*B62M 6/55* (2010.01)
*B62M 9/04* (2006.01)
*B62M 11/14* (2006.01)

(52) U.S. Cl.
CPC ............... *B62M 6/55* (2013.01); *B62M 9/04* (2013.01); *B62M 11/145* (2013.01); *B60Y 2200/12* (2013.01)

(58) Field of Classification Search
CPC .......... B62M 23/02; B62M 6/40; B62M 6/45; B62M 6/50; B62M 6/60
(Continued)

(56) References Cited

U.S. PATENT DOCUMENTS 4,782,722 A * 11/1988 Powell ................. B62M 11/145
475/213
4,936,597 A * 6/1990 Hartmann ............ B62M 11/145
280/231

(Continued)

FOREIGN PATENT DOCUMENTS

CN 2767311 Y 3/2006
CN 1815856 A 8/2006
(Continued)

OTHER PUBLICATIONS

International Search Report for PCT/EP2009/064375, dated Jan. 19, 2010.

*Primary Examiner* — Anne Marie M Boehler
(74) *Attorney, Agent, or Firm* — Norton Rose Fulbright US LLP; Gerard Messina

(57) ABSTRACT

A bicycle includes an electrical auxiliary drive, including an electric motor, a battery for storing electrical energy, which battery is connected to the electric motor, a crank mechanism having pedal cranks, which are mounted on a pedal crankshaft disposed about a crank axis, so as to be able to rotate, and a planetary gear for driving the bicycle both by the electric motor and by the muscle power of a driver, the planetary gear and the electric motor being disposed about the pedal crankshaft of the crank mechanism.

11 Claims, 3 Drawing Sheets

(58) Field of Classification Search
USPC .............. 180/220, 230, 206.1, 206.2, 206.4
See application file for complete search history.

(56) References Cited

U.S. PATENT DOCUMENTS

| | | | |
|---|---|---|---|
| 5,378,201 A * | 1/1995 | Lee ...................... | B62M 9/131 474/77 |
| 6,012,538 A | 1/2000 | Sonobe et al. | |
| 6,196,347 B1 | 3/2001 | Chao et al. | |
| 6,263,993 B1 | 7/2001 | Lin | |
| 6,276,479 B1 | 8/2001 | Suzuki et al. | |
| 6,296,072 B1 * | 10/2001 | Turner .................. | B62M 11/18 180/220 |
| 6,629,574 B2 | 10/2003 | Turner | |
| 7,749,121 B2 * | 7/2010 | Perng ..................... | B62M 6/55 475/5 |
| 8,210,974 B2 * | 7/2012 | Moeller .................. | B62M 6/65 180/65.51 |
| 9,758,212 B2 * | 9/2017 | Kimmich ............ | B62M 11/145 |
| 2002/0014366 A1 | 2/2002 | Turner | |
| 2006/0090943 A1 | 5/2006 | Perng | |
| 2010/0051373 A1 * | 3/2010 | Lee ......................... | B62M 6/55 180/206.4 |

FOREIGN PATENT DOCUMENTS

| | | | | |
|---|---|---|---|---|
| CN | 2817193 Y | | 9/2006 | |
| CN | 200948868 Y | | 9/2007 | |
| DE | 19629788 A1 | | 1/1998 | |
| GB | 2312403 | * | 10/1997 | ............ B62M 23/02 |
| JP | H02164685 A | | 6/1990 | |
| JP | H07301286 A | | 11/1995 | |
| JP | H08127385 A | | 5/1996 | |
| JP | H08175470 A | | 7/1996 | |
| JP | H09169290 A | | 6/1997 | |
| JP | H09189346 A | | 7/1997 | |
| JP | 2005-016732 A | | 1/2005 | |
| JP | 2007-205396 A | | 8/2007 | |
| JP | 2008-285069 A | | 11/2008 | |
| TW | I264399 B | | 10/2006 | |
| WO | 2000/43259 A1 | | 7/2000 | |

* cited by examiner

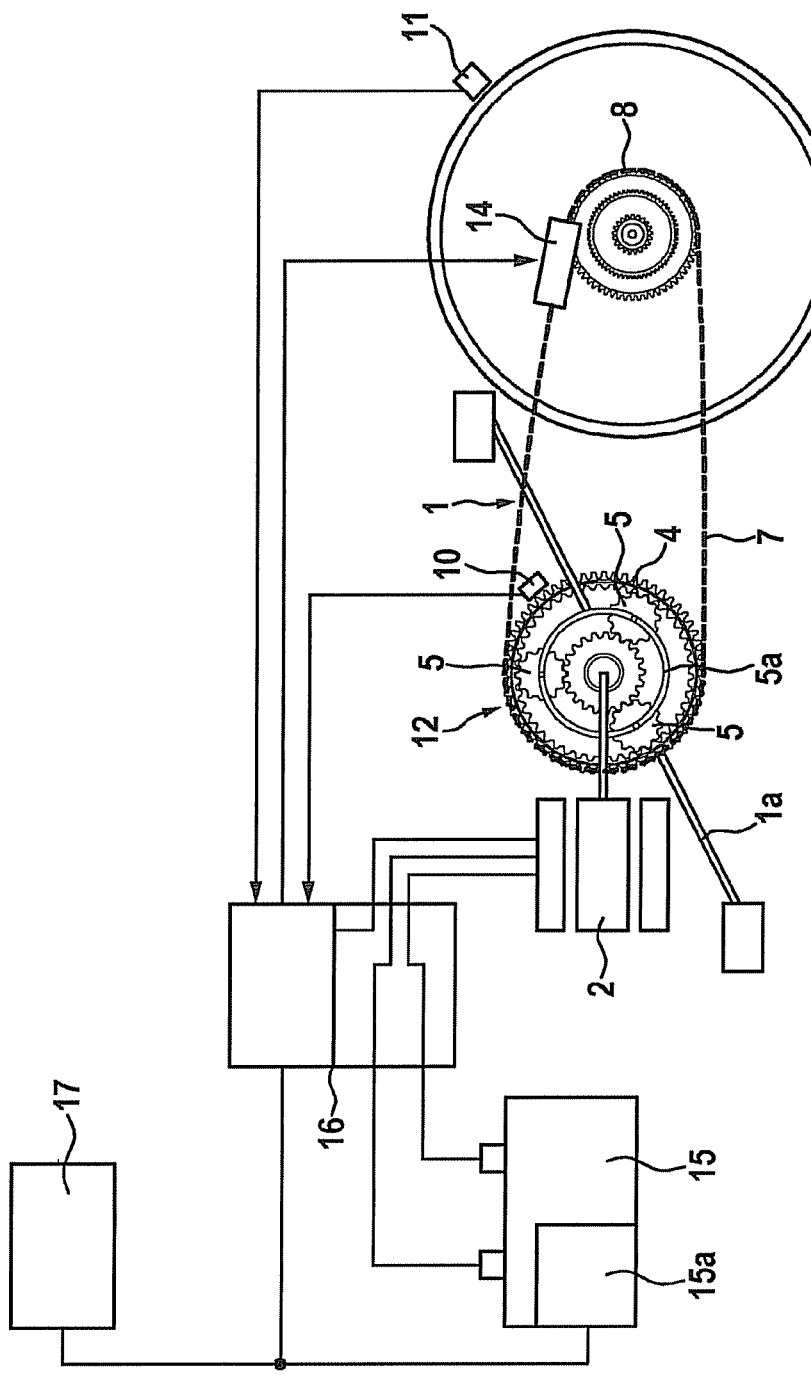

HYBRID DRIVE FOR AN ELECTRIC BICYCLE

CROSS REFERENCE TO RELATED APPLICATIONS

The present application is a divisional application of U.S. patent application Ser. No. 13/139,496, filed Aug. 23, 2011, which is a national phase of International Application No. PCT/EP2009/064375, filed Oct. 30, 2009, and claims priority to German Patent Application No. 10 2008 054 505.8, filed Dec. 11, 2008, and German Patent Application No. 10 2009 045 447.0, filed Oct. 7, 2009, the contents of each of which are hereby incorporated by reference in their entireties.

FIELD OF THE INVENTION

The present invention relates to a hybrid drive for an electric bicycle.

BACKGROUND INFORMATION

Electric bicycles in various configurations are conventional. For example, conventional electric bicycles are equipped with an electric drive in the hub of the front or rear wheel.

WO 91/19637 describes a hybrid drive for a hybrid vehicle. The hybrid vehicle is driven by an auxiliary motor, which drives the sun gear of a planetary gear disposed in a hub, the muscle power of the driver acting on the ring gear of the planetary gear. In the specific development described, the output is applied to the rear wheel of the hybrid vehicle, and the auxiliary motor is not integrated in the planetary gear. The separate placement of electric drive and gear has a disadvantageous effect on the handling and driving behavior of the vehicle, since this design shifts the center of gravity of the drive, and thus the vehicle, in the direction of the wheel drive.

SUMMARY

In contrast, the bicycle having the electric auxiliary drive according to example embodiments of the present invention and having the features described herein, has the advantage that the electric motor and the planetary gear are disposed jointly in a substantially centered and low mounted position on the bicycle in the region of the crank mechanism. This contributes substantially to a balanced and pleasant driving behavior of the vehicle, since the weight of the drive unit positioned in this manner causes the center of gravity of the bicycle to be shifted away from the drive wheel. Furthermore, the entire drive/gear unit may be arranged in a more compact manner and produced more cost-effectively due to the lower number of components. According to example embodiments of the present invention, the bicycle includes a planetary gear and an electric motor, both of which are disposed in the crank axis of the crank mechanism. The planetary gear is connected to the crank mechanism on the one side, and to the electric motor on the other side. This achieves an especially compact design together with the crank mechanism, and a low position of the center of gravity of the drive unit below the driver.

Furthermore, the electric motor is connected to the sun gear of the planetary gear, preferably via a hollow shaft surrounding the pedal crankshaft. In this manner the driving output of the electric motor to the planetary gear is able to take place independently of the actuation of the pedal crankshaft of the crank mechanism by the muscle power of the driver.

According to example embodiments of the present invention, the crank mechanism is connected to the planet carrier of the planetary gear. This achieves a compact and reliable operative connection. According to example embodiments of the present invention, the crank mechanism is connected to the ring gear of the planetary gear, which likewise realizes a compact and operationally reliable operative connection.

Moreover, the electric motor preferably has a locking device which includes a freewheel. This makes it possible to lock the rotor of the electric motor in order to allow the bicycle to be driven solely by muscle power, without drag of the electric motor.

According to example embodiments of the present invention, the ring gear of the planetary gear has external toothing in order to form an output of the planetary gear. Thus, conventional chains of derailleur gears or internal gear hubs may be used for driving the bicycle via the engagement with the external toothing of the ring gear.

In example embodiments, the bicycle has a gear shift mechanism, especially a derailleur gear or internal gear hub, the drive wheel being connected to the planetary gear. Thus, conventional gear shift mechanisms, which are widespread, operationally reliable and cost-effective, are able to be used for the bicycle according to example embodiments of the present invention having the electrical auxiliary drive.

Preferably, the bicycle is equipped with a control unit, an rpm sensor on the planetary gear, especially on the ring gear of the planetary gear, a speed sensor for detecting a bicycle speed, and an electrical actuator for performing a gear shift operation. The control unit is designed to control the electric motor as well as the electric actuator according to a specified control program and on the basis of the values of the rpm sensor and the speed sensor. This makes it possible to realize the entire driving control of the bicycle with the aid of a minimum of sensors and actuators, which in turn is reflected in increased cost efficiency.

According to example embodiments of the present invention, the control unit is set up to modify the torque of the electric motor in a gear shift operation, such that a load exerted on the gear shift mechanism is reduced. Because of this load reduction, the gear shift operation is able to be optimized and the durability or the service life of the chain and the shifting components improved due to a load-free gear shift operation.

Preferably, the electric motor is a DC motor or an electrically commutated motor. These designs are characterized by high operational reliability, serviceability and excellent cost efficiency, in particular.

In example embodiments, the bicycle has an input device for selecting different control programs for the control unit. For example, this allows the driver to set the degree of support of the hybrid drive in the most uncomplicated manner.

Furthermore, the ring gear has a number of teeth that is equal to the number of teeth of the planet wheels. This provides a gear ratio that is advantageous for the operation of the electric bicycle in all driving states.

Moreover, the bicycle has a battery control unit, which is connected to the control unit and records an operating state of the battery, such as a charge state or malfunctions of the battery, for example. This makes it possible to keep the driver informed about the available energy of the battery and about possible interruptions at all times.

According to example embodiments of the present invention, the crank mechanism is connected to the sun gear, the electric motor is connected to a planet carrier, and a chain for an output is connected to the ring gear. Thus, all parts of the planetary gear are rotating, and a reduction in a rotational speed of the electric motor is achieved, in particular.

In an especially preferred manner, the bicycle includes a second planetary gear, which is interconnected between the electric motor and a planet carrier of the first planetary gear, the second planetary gear likewise being disposed around the pedal crankshaft of the crank mechanism. In this preferred exemplary embodiment, two planetary gears and an electric motor are therefore disposed in a compact manner between the pedal cranks. With the aid of the second planetary gear, especially the rotational speed of the electric motor is able to be reduced, while all desired drive functions are realizable. The second planetary gear preferably reduces the rotational speed of the electric motor, in particular to a value of 1:8.

It is especially preferred if the sun gear, the planet wheels and the ring gear of the first planetary gear are provided with helical teeth, and the sun gear, the planet wheels and the ring gear of the second planetary gear are likewise provided with helical teeth. One planet wheel of the first planetary gear is directly connected to a planet wheel of the second planetary gear in each case. This makes it possible to develop the two planetary gears without planet carriers, so that the number of components of the planetary gears is able to be reduced. Furthermore, possible space savings may be provided in the axial direction, so that the electric auxiliary drive and the planet wheels are able to be placed on the pedal crankshaft without any problems. The reduced number of components also has an advantageous effect on the weight and costs.

Moreover, it is preferred if a clutch is provided in addition, which is situated at the crank mechanism and designed to output a driver force to the sun gear or to the ring gear of the first planetary gear. This makes it possible to realize two different operating modes. If the driver power is transmitted via the clutch to the sun gear, then driving with electrical support by the electric motor results when the electric motor is connected in addition. If the driver force is transmitted to the ring gear, emergency driving without electrical support is enabled in the event that the electrical system is not available. Thus, the bicycle is always able to be driven solely by the driver's power, and there is no need for unnecessary other moving parts of the planetary gear or the rotor of the electric motor to be moving along, due to the direct transmission of the driver power to the ring gear and from there, to the chain. The clutch is preferably able to be operated manually.

Example embodiments of the present invention are described in detail below, with reference to the accompanying drawing.

BRIEF DESCRIPTION OF THE DRAWINGS

FIG. 3 a schematic illustration of the components of the electric bicycle of the first exemplary embodiment.

DETAILED DESCRIPTION

Figure 2:
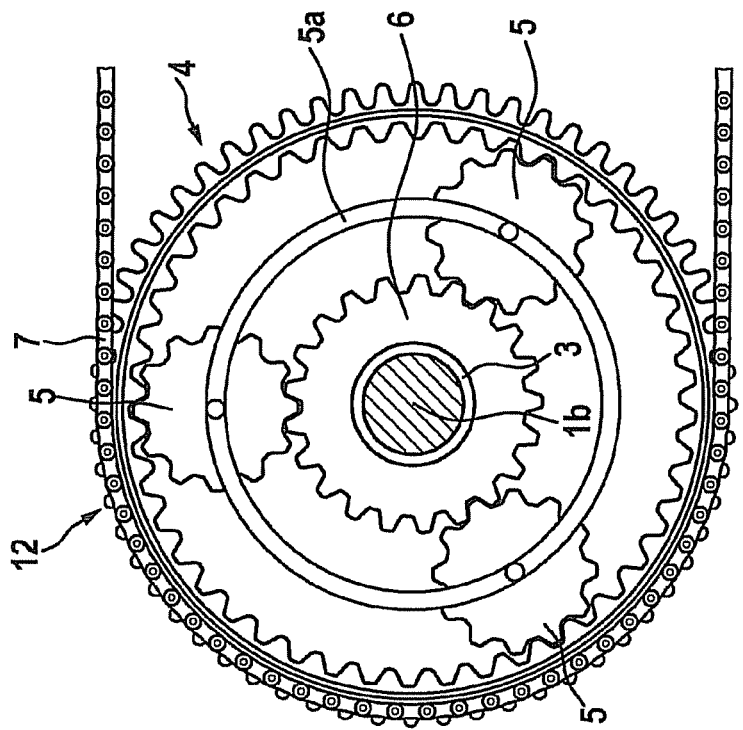
FIG. 2 a schematic sectional view of the planetary gear of FIG. 1.
Figure 1:
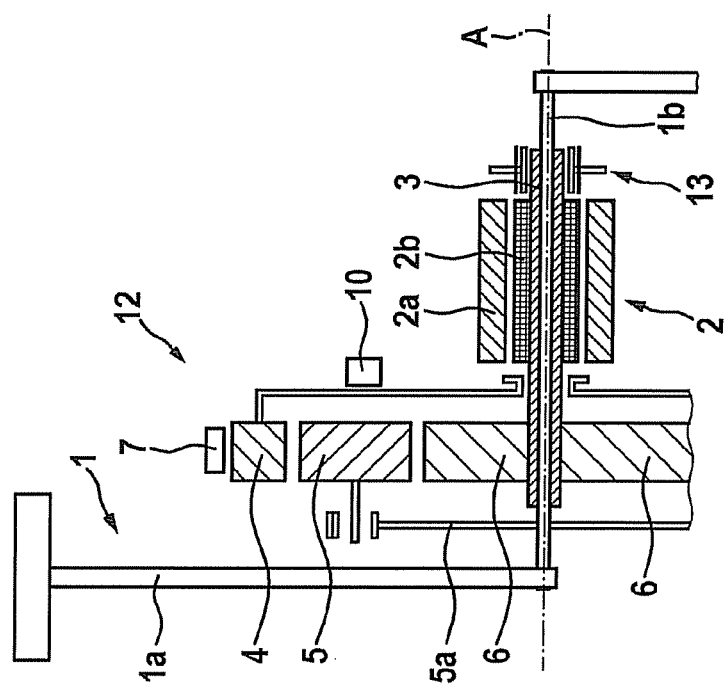
FIG. 1 a schematic sectional view of a crank mechanism having a planetary gear and electric motor disposed thereon, according to a first exemplary embodiment of the present invention.

With reference to FIGS. 1 to 3, a bicycle having an electric auxiliary drive according to a first preferred exemplary embodiment of the present invention is described in detail below.

As can be gathered from the schematic sectional view in FIG. 1, the bicycle having an electric auxiliary drive is equipped with a crank mechanism 1a, which includes pedal cranks 1 affixed at both ends of a pedal crankshaft 1b, the pedal crankshaft being disposed so as to be rotatable about a crank axis A. An electric motor 2 provided with a stator 2a and a rotor 2b is disposed on a hollow shaft 3, rotor 2b being fixedly connected to hollow shaft 3, which in turn is fixedly connected to a sun wheel 6 of a planetary gear 12. Pedal crankshaft 1b of crank mechanism 1 is routed through hollow shaft 3 and fixedly connected to a planet carrier 5a of planetary gear 12 on which planet wheels 5 are disposed in a manner that enables free rotation, the planet wheels being in engagement with sun gear 6 and a ring gear 4 of planetary gear 12. Ring gear 4 is mounted on hollow shaft 3 in freely rotatable manner. The outer periphery of ring gear 4 is provided with external toothing, which is in engagement with components of a chain 7 in order to transmit the output of ring gear 4 to chain 7 of the bicycle. An rpm sensor 10, which records the rotational speed of ring gear 4, is provided on the outer side of ring gear 4.

Rotor 2b of electric motor 2 or sun gear 6 is able to be fixedly connected to the frame of the bicycle with the aid of a locking device 13. Locking device 13 has a freewheel in order to allow a rotation of rotor 2b or sun gear 6 only in the positive direction of rotation, and furthermore to ensure that sun gear 6 is firmly supported in the negative direction of rotation. Locking device 13 may be actuated mechanically or electrically; in an electric actuation, a currentless state of the device brings about the locked position, and the energized state of the device brings about the unlocked position.

FIG. 2 shows a simplified schematic sectional view of planetary gear 12, which view is enlarged compared to FIG. 1 and shows pedal crankshaft 1b, hollow shaft 3, sun gear 6, planet wheels 5 on planet carrier 5a, and the ring gear including chain 7.

FIG. 3 represents a schematic illustration of the components of the electric bicycle. For a better understanding, electric motor 2 has been drawn next to planetary gear 12 in FIG. 3 instead of in the correct axial placement relative to the center of sun gear 6 (behind planetary gear 12 in FIG. 2, and therefore not visible). As can be gathered from FIG. 3, chain 7 is wound around the external teething of ring gear 4 and a gear shift mechanism 8, which is disposed on the hub of a drive wheel 9. Gear shift mechanism 8 may be a conventional derailleur gear having a sprocket package, or a hub gear. A preferably electrical actuator 14 is disposed between chain 7 and gear shift mechanism 8. This actuator 14 may be a magnet, for instance, whose position is modifiable via a Bowden cable (mechanical) or via a signal (electrical), the position being assigned precisely to one gear of gear shift mechanism 9.

A central control unit (CPU) 16 is provided for the control of the hybrid drive of the bicycle. Control unit 16 receives the signals from rpm sensor 10 situated on ring gear 4 of planetary gear 12, as well as signals from a speed sensor 11 situated on drive wheel 9, which are required for controlling the drive. Furthermore, for the control, motor 2 is directly connected to control unit 16, and for the energy supply, to a battery 15. In addition, control unit 16 is connected to actuator 14 in order to trigger a shift operation. Finally, via a communication bus, control unit 16 is connected to a battery control unit 15a for monitoring the operating state of battery 15, and also to an input device 17, which is set up in such a way that the driver may call up different driving or control programs of control unit 16 for different driving states of the bicycle.

A description of the driving states of the hybrid drive that may be realized using this system are provided in the following:

1. Driveaway:

When the vehicle is standing still, the rotational speeds at ring gear 4, planet carrier 5a and sun gear 6 amount to zero. During driveaway the driver generates a torque by muscle power on planetary support 5a, which torque supports itself against the driving resistance. This accelerates sun gear 6, and as soon as the electric drive starts rotating, it generates a torque that in turn supports itself on the driver when the driver has selected electric motor support at the input device. This transmits the torque to the output, or ring gear 4. Electric motor 2 now supplies positive drive power. The output of the driver is approximately zero since the rotational speed at planet carrier 5a is equal to zero. The driver is able to generate the support moment by his own body weight. Strong and comfortable drive-away support is therefore able to be realized, which the driver is able to set or control by the torque at crank mechanism 1.

2. Driving with Support:

The driver actuates crank mechanism 1, and electric motor 2 generates a continuous drive torque, which is supported by the driver, while all components of planetary gear 12 are in a rotating state when the driver presses down on the pedals. The output by the driver and the output of the electric drive as well are positive. This makes it possible, for example, to generate support in uphill driving or for compensating other driving resistances, or the torque is able to be increased briefly in acceleration phases.

3. Free-Running:

If the driver does not apply torque at planet carrier 5a, i.e., does not pedal, planet carrier 5a is torque-free. The bicycle is driven solely by electric motor 2. This causes sun gear 6 to rotate in proportion to ring gear 4. Planet carrier 5a does not move.

4. Recuperation:

This state of energy recuperation comes about when the driver is braking. The driver generates a negative torque at planet carrier 5a (backpedaling). This torque is supported by a regenerative torque of electric motor 2. This decelerates the bicycle. The driver output is approximately zero since planet carrier 5a is stationary. The driver may use his or her body weight for support. Electric motor 2 is operated as generator and generates an output by which it charges the battery. During the recuperation, the torque is advantageously able to be set intuitively by the driver, by a coaster brake. In downhill driving, a generator function is able to be provided if the bicycle is not equipped with a freewheel or if the freewheel is inactivated.

5. Emergency Running Operation

When battery 15 is empty or electric motor 2 defective, sun gear 6 is no longer able to be driven by electric motor 2. This makes the vehicle undrivable. In order to allow a conventional driving operation under such circumstances, using the muscle power of the driver (i.e., driving without motor), hollow shaft 3, which is fixedly connected to rotor 2b of electric motor 2 and sun gear 6, is able to be locked via locking device 13. The freewheel in locking device 13 ensures that sun gear 6 is able to rotate in one direction only. In the driving case, locking device 13 is able to support the torque of the driver. When planet carrier 5a is stationary, sun gear 6 is able to rotate, as described for the freewheeling state.

6. Raising the Load Point

In special cases it may be desirable to charge the battery by muscle power. In such a case the system allows what is referred to as load point raising, i.e., at low driving resistance, the motor may be operated as generator by the muscle power of the driver, in order to charge the battery. In this state the driver drives both crank mechanism 1 and electric motor 2 (locking device 13 not fixated), and in the process is able to adjust the rotational speed at the crank as desired.

7. Torque Reduction During the Gear-Shift Operation

In order to prevent damage to or excessive wear of the conventional derailleur gears or hub gears or the chain during a gear shift operation under load, in one special development control unit 16 is set up in such a way that a control takes place for the purpose of modifying the torque at planetary gear 12 in order to reduce the load exerted by the hybrid drive on gear shift mechanism 8 via chain 7.

In a gear shift operation (both when down-shifting and up-shifting), the torque or the drive of electric motor 2 and thus the torque at sun gear 6 of planetary gear 12 is briefly reduced for this purpose. This provides soft and comfortable shift operations at the derailleur gear or hub gear, and the gear components are protected.

In addition to the afore-described exemplary embodiment, an alternative exemplary embodiment for the electric auxiliary drive is possible, in which electric motor 2 is acting on sun gear 6 of planetary gear 12, the driver force is acting on ring gear 4 of planetary gear 12 via crank mechanism 1, and the output to chain 7 takes place via planet carrier 5a of planetary gear 12. This exemplary embodiment has the advantage of lower rolling work in the gear and thus greater efficiency. However, a disadvantage in comparison with the afore-described exemplary embodiment is that a lower gear ratio is made available to the driver in the event of an emergency driving operation. In both exemplary embodiments, either a DC motor or an electronically commutated motor may be used as electric motor 2 for the electric drive. Electric motor 2 may utilize the gear ratios of the conventional gear shift mechanism used and may thus have a compact design. The minimized unit volume of electric motor 2 facilitates its integration with planetary gear 12 on crank mechanism 1.

In comparison with conventional arrangements, the bicycle according to example embodiments of the present invention having the electrical auxiliary drive not only has improved driving characteristics due to the more advantageous placement of the overall gravitational center below the driver, but also provides the advantage that the translation of the drive is able to be set in a stepless manner via the rotational speed at electric motor 2, so that individual gear ratios of gear shift mechanism 8 or a derailer (for a second chain ring) at crank mechanism 1 may be dispensed with. Furthermore, the drive is able to be regulated solely by the rotational speeds recorded by rpm sensor 10 at the ring gear and by speed sensor 11 at drive wheel 9. A torque sensor is not required. Thus, due to the lower number of components and the simpler overall structure of the bicycle, considerable savings in production costs and improved cost efficiency are able to be achieved.

In the following, making reference to FIG. 4, a second exemplary embodiment of the present invention is described in detail, identical or functionally equivalent components having been provided with the same reference numerals as in the first exemplary embodiment.

Figure 4:
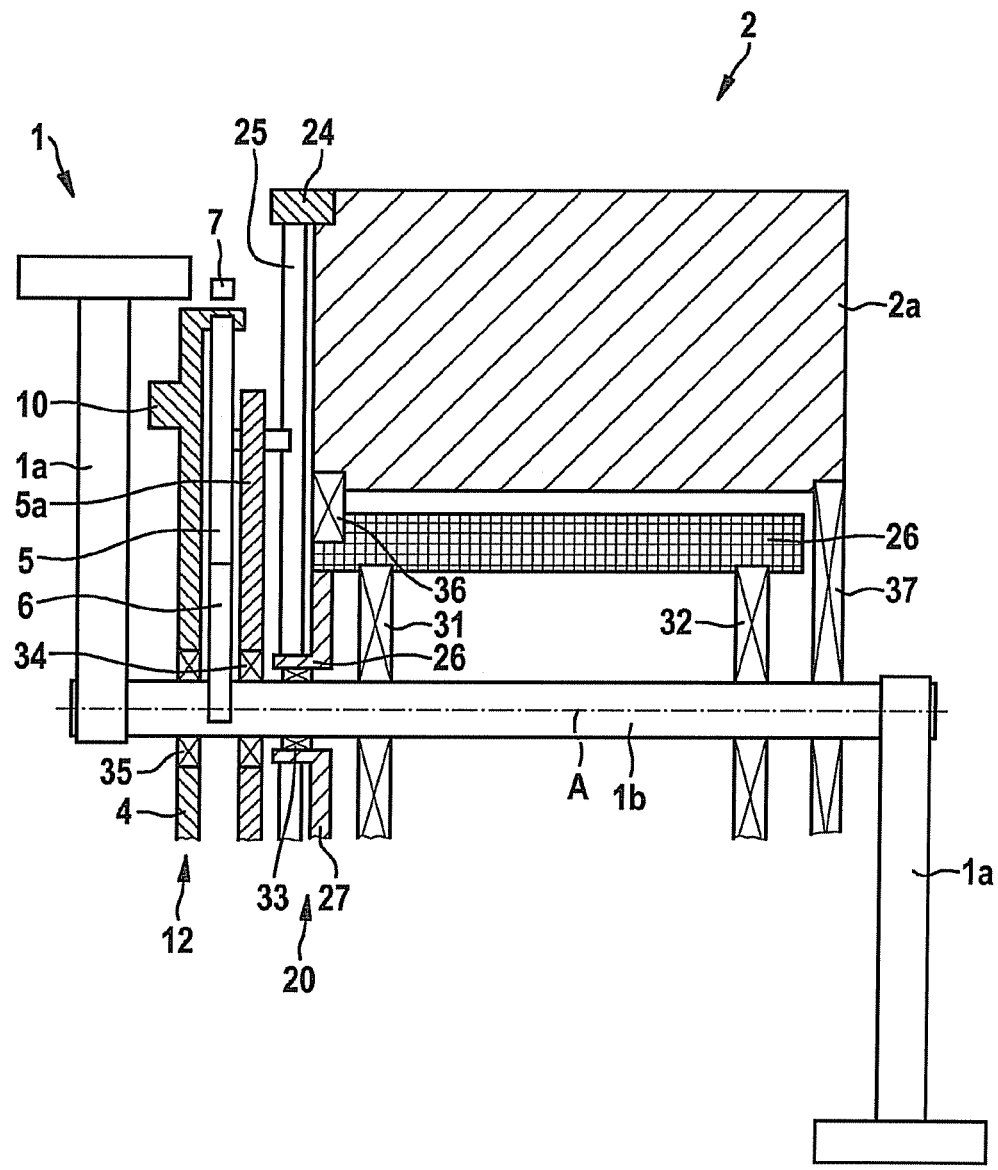
FIG. 4 a schematic sectional view of a crank mechanism having a planetary gear and electric motor disposed thereon, according to a second exemplary embodiment of the present invention.

As can be gathered from FIG. 4, the bicycle having an electrical auxiliary drive once again is equipped with a crank mechanism 1 having pedal cranks 1a and a pedal crankshaft 1b.

Also, electric motor 2 as well as first planetary gear 12 and a second planetary gear 20 are likewise disposed around pedal crankshaft 1b. Pedal crankshaft 1a, the two planetary gears 12, 20, and the electric motor are both disposed in axis A of pedal crankshaft 1b. Second planetary gear 20 is interconnected between electric motor 2 and first planetary gear 12.

Here, too, the drive unit shown in FIG. 4 includes two drives and one output, the first drive being provided by the driver's pedaling, and the second drive is electric motor 2. The output once again is a chain 7, which engages at the outer periphery of ring gear 7 of first planetary gear. The driver's power is introduced via first planetary gear 12, and the torque of electric motor 2 is introduced via second planetary gear 20. Second planetary gear 20 is used for reducing the rotational speed of the electric drive. This makes it possible to provide electric motor 2 as a drive that features high rotational speed, so that—in comparison with an electric drive featuring low rotational speeds—the electric motor may have a lower weight while providing the same output. Furthermore, this makes it possible to use a high-efficiency electric motor as electric motor 2.

As illustrated in FIG. 4, rotor 2b of electric motor 2 is mounted on pedal crankshaft 1b so as to be able to rotate, via a first bearing 31 and a second bearing 32. Rotor 2b is connected to a sun gear 26 of second planetary gear 20 by way of a connection collar 27. Sun gear 26 is supported on pedal crankshaft 1b with the aid of a third bearing 33. Sun gear 26 is in engagement with a plurality of planet wheels 25 of second planetary gear 20, planet wheels 25 being supported on a planet carrier 5a. In addition, planet wheels 25 are in engagement with a stationary ring gear 24 of second planetary gear 20, ring gear 24 being fixed in place on stator 2a, as shown in FIG. 4. Planet carrier 5a is mounted on pedal crankshaft 1b via a fourth bearing 34. As can also be gathered from FIG. 4, a fifth bearing 35 supports ring gear 4 of first planetary gear 12. Furthermore, sun gear 6 of the first planetary gear is fixedly connected to pedal crankshaft 1b. Planet wheels 5 of first planetary gear 12, which are likewise mounted on planet carrier 5a, mesh both with sun gear 6 and ring gear 4 of the first planetary gear. Here, too, ring gear 4 has external toothing for a connection to chain 7. Stator 2a is mounted on the rotor via a sixth bearing 36, and on pedal crankshaft 1b via a seventh bearing 37. In the axial direction of crank axis A, the second planetary gear is thus disposed between first planetary gear 12 and electric motor 2.

Consequently, first planetary gear 12 includes sun gear 6, ring gear 4, planet wheels 5, and planet carrier 5a. Second planetary gear 20 includes sun gear 26, ring gear 24, planet wheels 25, and also planet carrier 5a. By using shared planet carrier 5a, on which planet wheels 5 or 25 are disposed on one axial side in each case, it is therefore possible to reduce the number of components and thus the weight of the drive. Pedal crankshaft 1b is also used for the support of ring gear 4, planet wheel carrier 5a, sun gear 26, as well as rotor 2b and, at least on one side, stator 2a.

When electric motor 2 is activated, second planetary gear 20 thus reduces its engine speed and, if applicable, adds a output by the driver via first planetary gear 12. The output takes place at ring gear 4 of first planetary drive 12, via chain 7. As shown in FIG. 4, the drive unit according to the present invention thus is of only very short length in the axial direction of crank axis A, so that the length of pedal crankshaft 1 is sufficient for placing the two planetary gears 12, 20 and electric motor 20 in this region. The fact that it is possible to reduce the rotational speed with the aid of second planetary gear 20, furthermore makes it possible to build electric motor 2 in a very compact and low-weight manner. This improves the handling of the bicycle, and electric motor 2 is able to be operated at higher rotational speeds and to provide greater efficiency in the process, so that the overall range of the electric bicycle may be improved significantly.

In all other respects this exemplary embodiment is similar to the previous exemplary embodiment, so that reference may be made to the description supplied there.

In addition, it should be noted that the drive unit shown in FIG. 4 is able to be made even more compact if planetary carrier 5a is omitted and planet wheels 5 of first planetary gear 12 are directly connected to planet wheels 25 of second planetary gear 20, e.g., via a separate connection axle. This makes it possible to realize an even more compact design.

What is claimed is:

1. A bicycle having an electrical auxiliary drive, comprising:
   an electric motor;
   a battery adapted to store electrical energy and connected to the electric motor;
   a crank mechanism having pedal cranks affixed on a pedal crankshaft, which is rotatably disposed about a crank axis;
   a first planetary gear adapted to drive the bicycle both by the electric motor and by muscle power of a driver, wherein the first planetary gear and the electric motor are disposed around the pedal crankshaft of the crank mechanism, and wherein the crank mechanism is connected to a ring gear of the first planetary gear;
   a second planetary gear arranged between the first planetary gear and the electric motor; and
   a planet carrier that is directly connected to planet wheels of the first planetary gear and is rotatably connected to planet wheels of the second planetary gear.

2. The bicycle of claim 1, wherein the planet carrier to which planet wheels of the first planetary gear are directly connected is mounted on the pedal crankshaft, and the crank mechanism is connected to the ring gear via a sun gear and the first planetary gear.

3. The bicycle of claim 1, wherein a sun gear of the first planetary gear is mounted on the pedal crankshaft.

4. The bicycle of claim 1, wherein the electric motor includes a rotor that is directly connected to a sun gear of the second planetary gear.

5. The bicycle of claim 1, further comprising:
   a chain wound around a component of a drive wheel and directly connected to the ring gear.

6. The bicycle of claim 5, wherein the component of the drive wheel around which the chain is wound is a gear shift mechanism.

7. The bicycle of claim 1, wherein the ring gear of the first planetary gear is mounted on the pedal crankshaft.

8. The bicycle of claim 7, further comprising:
   a chain wound around a component of a drive wheel and to which a drive output is provided by the planet carrier.

9. The bicycle of claim 8, wherein the electric motor includes a rotor that is fixedly connected to a sun gear of the bicycle.

10. The bicycle of claim 9, wherein the sun gear is part of the second planetary gear.

11. A bicycle having an electrical auxiliary drive, comprising:
- an electric motor;
- a battery adapted to store electrical energy and connected to the electric motor;
- a crank mechanism having pedal cranks affixed on a pedal crankshaft, which is rotatably disposed about a crank axis;
- a first planetary gear adapted to drive the bicycle both by the electric motor and by muscle power of a driver, wherein the first planetary gear and the electric motor are disposed around the pedal crankshaft of the crank mechanism, and wherein the crank mechanism is connected to a ring gear of the first planetary gear;
- a second planetary gear arranged between the first planetary gear and the electric motor, wherein the electric motor includes a rotor that is directly connected to a sun gear of the second planetary gear; and
- a planet carrier that is directly connected to planet wheels of the first planetary gear and is rotatably connected to planet wheels of the second planetary gear.

* * * * *